5975X
M. Mettee,
Pump Lever.
Patented May 20, 1830.
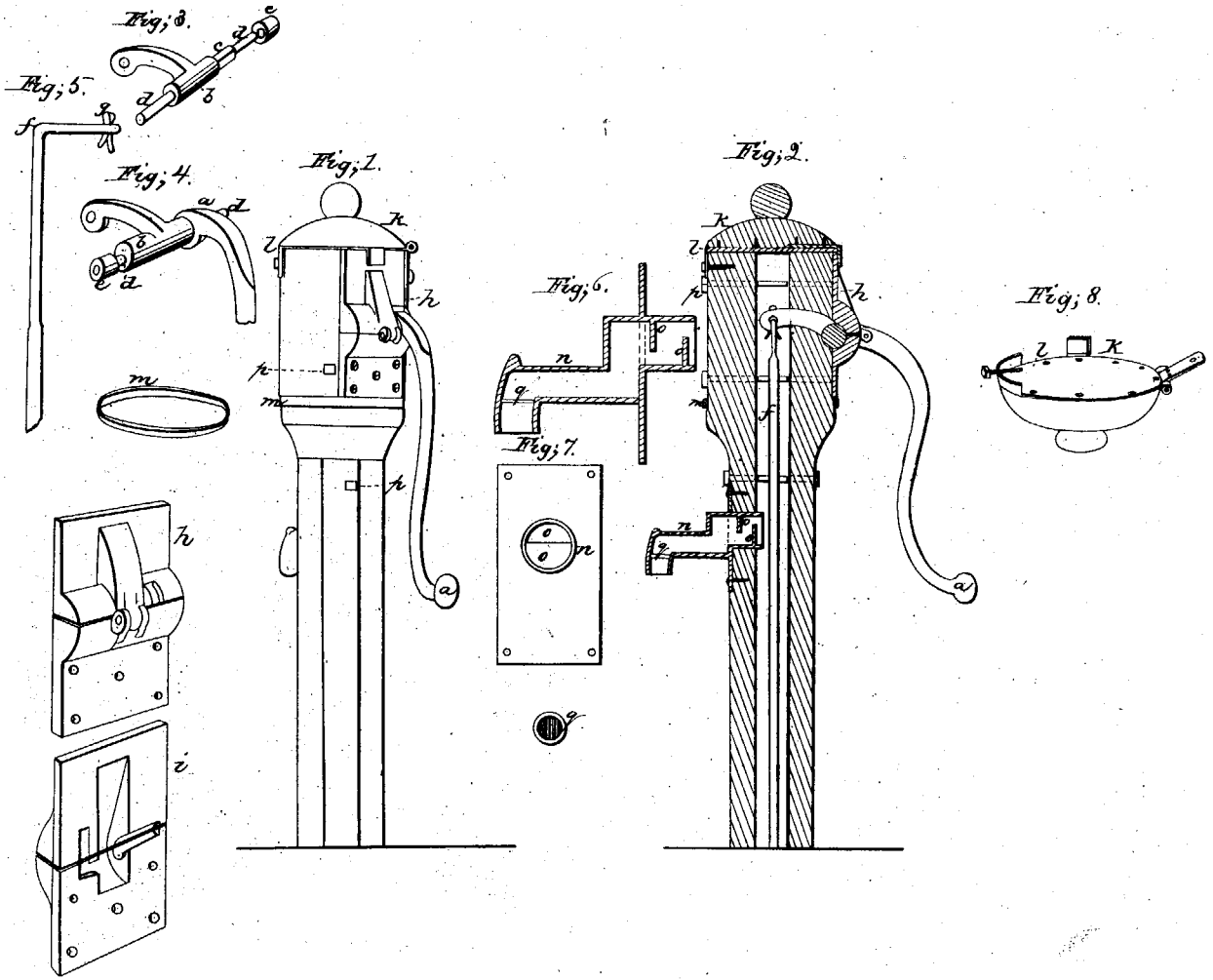
N. PETERS, PHOTO-LITHOGRAPHER, WASHINGTON, D. C.

X5975 Aug 20 1840

Martin Mattee of Baltimore State of Maryland.

Letters Patent.

The Schedule referred to in these Letters Patent and making part of the same, containing a description in the words of the said Martin Mattee of his improvement in Pumps:

To all to whom these presents shall come,

Be it known that I Martin Mattee of the City and County of Baltimore and State of Maryland, have invented a new and useful improvement in Water Pumps (or land pumps) the object of which is to prevent the introduction of foreign substances through the top spout and handle mortise of the same, so as to impede the operation of the piston and of which the following is a full and exact description of the construction and operation of the same as invented and improved by me 1st The fulcrum (most commonly called by pump makers the neck of the handle) is welded or united to the pin (or gud-geon) of the same forming one solid piece terminating at said pin, then about an inch from the right side of said neck, the pin is shouldered in square, Then a square hole is punched in the upper end of the lever, or that part of the handle which hangs outside of the pump which is then heated and drove on to the square shoulder of said pin as it cools it becomes very tight and close by shrinking then as commonly the 2 ends of the pin (viz) from the lever or handle on the right side and from the fulcrum or neck on the left) is rounded about an inch each, where they play in the fulcrum box during the operation of the handle, two steel ferrils are then made and put on the 2 ends of the pin, loosely to serve in some measure as piston rollers to prevent the casting being cut out so soon.

2nd The hook at the upper end of the piston instead of round is bent square or at right angles, and after it is broken in the [illegible]

[illegible]

112 X5975 eye, a spring key is dropped into it, so that the piston can be un
hooked, without taking out the handle, it is also calculated to last
longer the friction being more regular than in a round bent hook,
which cuts out tolerable soon, — —

3rd. The fulcrum box is made of cast iron (or wood if most
convenient) the lower part of which from the fulcrum pin
downwards is permanently fastened to the pump by 5 square
headed bolts screwed into the wood, the other half, say
from the pin, upwards, is fastened to the lower part by a joint
hinge, the joint of which is thrown about one inch or more down
from the centre (or that part where the two castings separate
from each other) the object of which is to throw the upper cas
tings some what off when opened in order to slip out the handle
from the right side, or from where the pin at that end rests on
the casting There is also a flange or cap at the right & left of
the centre of the casting which completely hides the two ends
of the pin as also another on the upper and lower part of
said casting. which fits tolerably close around the pin, in
the space between the neck and lever. (or handle) the handle
playing between said flange on its left and the bearing for
the pin in the casting on its right the upper casting has
also a projection or swell about 2½ inches wide in the
centre thereof, commencing at the pin, and gradually
diminishing to nothing before it quite reaches the upper end.
this is to prevent the fulcrum or neck from striking against
the same during the operation of the handle, the handle as
may be expected hangs about two inches or more out of centre
to the right side of the pump, nothing is seen of the neck, and pin
which is completely enclosed in the said ~~fulcrum~~ box or casting
which also entirely encloses the mortice for the handle, 4th. The bell cap at the top of the pump, has a plate cov
ering [illegible] and screwed to the inner part of the same to prevent its splitting with the sun, said plate has a joint fastened
at one end to the pump, and at the other it is bent down 3 or
4 inches with a hole in the end and a square headed bolt
screwed through the same, also into the pump, there is also
a small plate screwed on to the under part of the aforemen
tioned cap. with one end bent down about an inch, which
hooks over the upper casting when the cap is close down,
which secures the same (casting) close up to the pump, and
when any repairs are wanting, there is nothing to do but
take out the aforementioned screw bolt which fastens down
the aforementioned half plate (which secures the cap) and
all comes apart immediately 5th. As the pumps are now made to taper upwards, a
band is drove down and on which rests the fulcrum box, said
band prevents the pump splitting with the sun 6th. The spout is made of cast-iron with a plate or flange
screwed or bolted to the pump it then has a knee about 3 or
4 inches down along side the pump, it then passes out in
a straight line as usual parallel with the part which
runs into the pump, The nozzle of said spout is turned
down about an inch and a half similar to a still
cock, and has a grating cast in the same about an inch
and a half up from the lower extremity of the same,
A Hook or rest is cast on the top of said nozzle for the
bucket to hang upon the part which runs into the pump
is an inch longer in diameter than the outside part, in
order to admit of 2 half headings or semicircular pieces
placed on opposite sides, the one 2 inches in from the
other, so that the water passes into the pipe along one side
and then turns along the other side, and then out 7th. A square headed bolt is screwed into the pump
just above the spout and another about an inch below
the handle [illegible], and 3 more a little above, screwed into

[illegible] X5975

3 of the other angles, the object of which is to prevent also the
pump from cracking or splitting with the sun, as they fre-
quently do, I forgot to mention that a circular grating is
also put in the spout at the extremity of the inner end,
which runs into the pump, perhaps I shall never have any
occasion to make use of the last mentioned grating, nor yet
of the aforementioned headings yet I wish to have them inser-
ted in the Patent Witnesses
John Gill
James L. D. Gill Martin Mettee

[illegible] 1260